(12) United States Patent
Chiang

(10) Patent No.: US 8,430,553 B2
(45) Date of Patent: Apr. 30, 2013

(54) BACKLIGHT MODULE AND ELECTRONIC DEVICE USING THE SAME

(75) Inventor: Chia-Chin Chiang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 358 days.

(21) Appl. No.: 12/890,850

(22) Filed: Sep. 27, 2010

(65) Prior Publication Data
US 2012/0026752 A1 Feb. 2, 2012

(30) Foreign Application Priority Data
Jul. 29, 2010 (CN) .......................... 2010 2 0273795

(51) Int. Cl.
*F21V 7/04* (2006.01)

(52) U.S. Cl.
USPC ............ 362/632; 349/65; 362/97.3; 362/612; 362/627; 362/628; 362/631; 362/633; 362/634

(58) Field of Classification Search ................... 40/546; 349/62, 65; 362/97.2, 97.3, 612, 627–629, 362/630–634
See application file for complete search history.

(56) References Cited

U.S. PATENT DOCUMENTS 7,681,347 B1 * 3/2010 Welker et al. ................... 40/546
8,197,113 B2 * 6/2012 Park et al. ..................... 362/631

* cited by examiner

*Primary Examiner* — Stephen F Husar
(74) *Attorney, Agent, or Firm* — Altis Law Group, Inc.

(57) ABSTRACT

A backlight module includes a support frame, two light sources, and a light guide film. The support frame includes a support portion and a fixing portion connected to an edge of the support portion, and the support frame defines at least one receiving groove. Each light source includes a light output surface and is received in the support frame. The light guide film includes two light input surfaces at the opposite ends thereof and two light guide portions connected with the light input surfaces. The light input surfaces of the light guide film face the light output surfaces of the light sources.

18 Claims, 5 Drawing Sheets

BACKLIGHT MODULE AND ELECTRONIC DEVICE USING THE SAME

BACKGROUND

1. Technical Field

The present disclosure generally relates to backlighting, and more particularly to a backlight module applied in an electronic device.

2. Description of Related Art

In order to meet market demands, many electronic devices include the capability for light to be emitted through housings thereof. Most electronic devices include fiber backlight modules in which fibers are applied to guide light. However, the large volume and complex assembly process of the fiber backlight modules play a negative role in the minimization of the electronic devices. Furthermore, the fiber has a relatively large diameter and is not easily curved, such that the function of light emission is difficult to achieve.

Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

The backlight module may be applied in any electronic device such as notebook computers, LCD monitors, digital cameras, and others. Here, for convenience, the backlight module described and illustrated is applied in a mobile phone.

Figure 1:
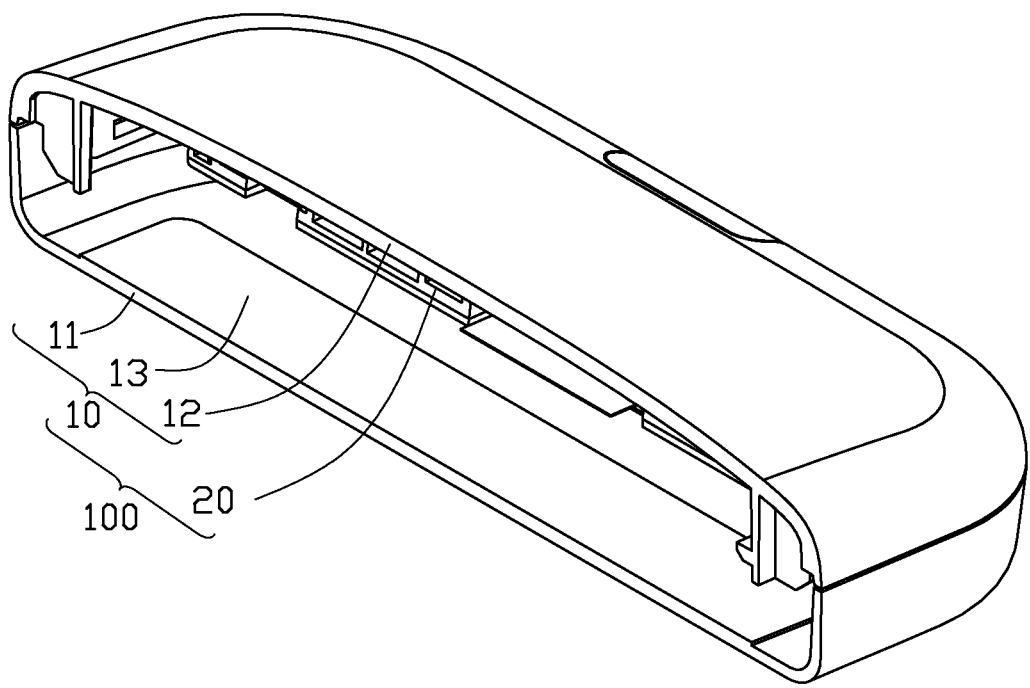
FIG. 1 is a partial assembled, isometric view of an electronic device including a backlight module.
Figure 2:
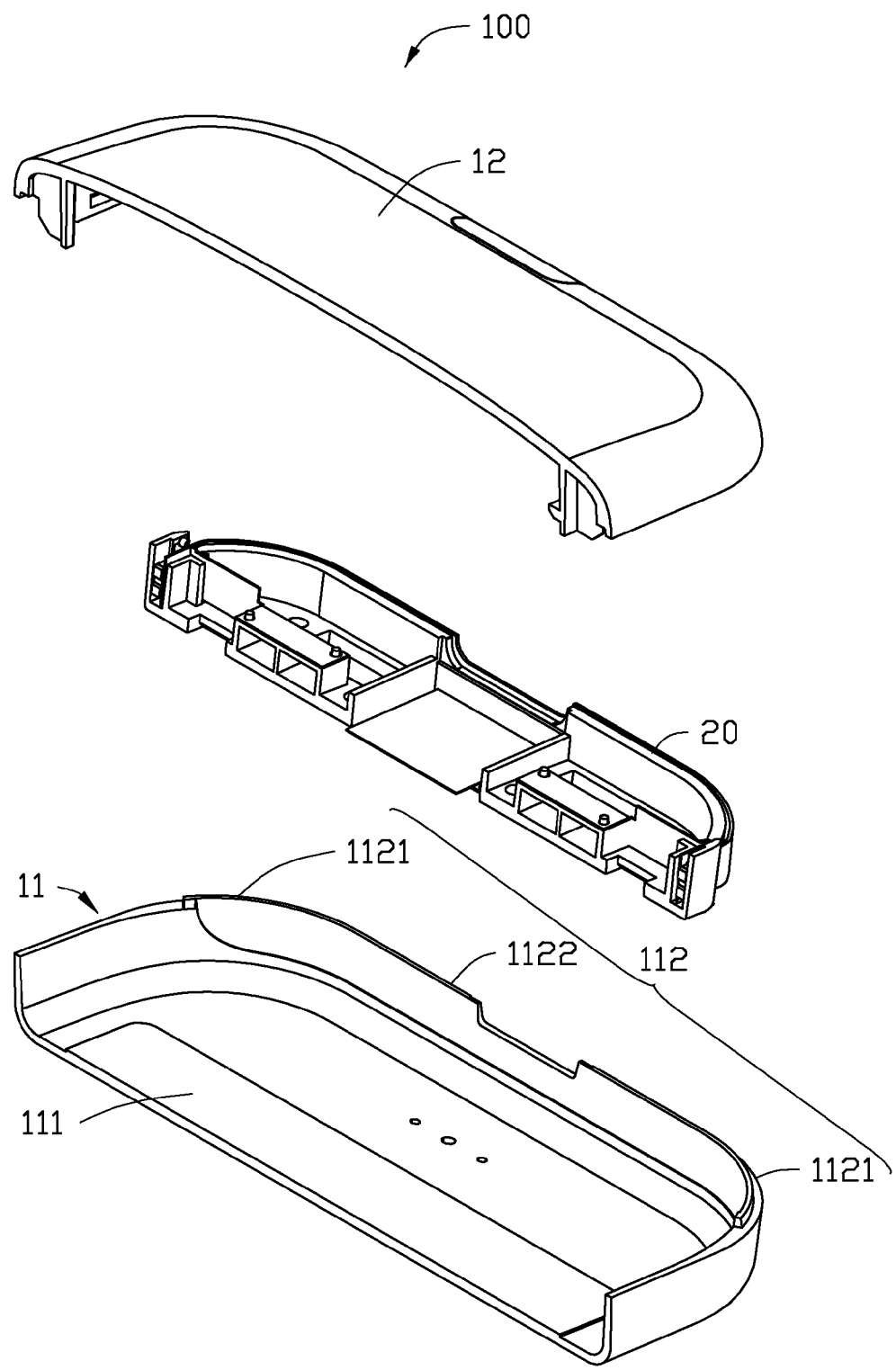
FIG. 2 is a partially exploded, isometric view of the electronic device of FIG. 1.

Referring to FIGS. 1 and 2, an electronic device 100 includes a housing 10 and a backlight module 20 received in the housing 10. The housing 10 includes a first cover 11 and a second cover 12 positioned on the first cover 11. The second cover 12 and the first cover 11 cooperatively define a receiving space 13 therebetween. The first and second covers 11, 12 have a plurality of latching structures (not shown) to connect the first and second covers 11, 12.

The first cover 11 includes a bottom surface 111 and a sidewall 112 substantially perpendicular to the bottom surface 111 and connects with an edge of the bottom surface 111. The sidewall 112 is of transparent material, and the sidewall 112 includes a first transparent part 1122 and two second transparent parts 1121 connecting to opposite ends of the first transparent part 1122. In the illustrated embodiment, the first transparent part 1122 is straight, and the second transparent parts 1121 are curved. Alternatively, the sidewall 112 of transparent material may be formed on the second cover 12 or on both the first and second covers 11, 12.

Figure 3:
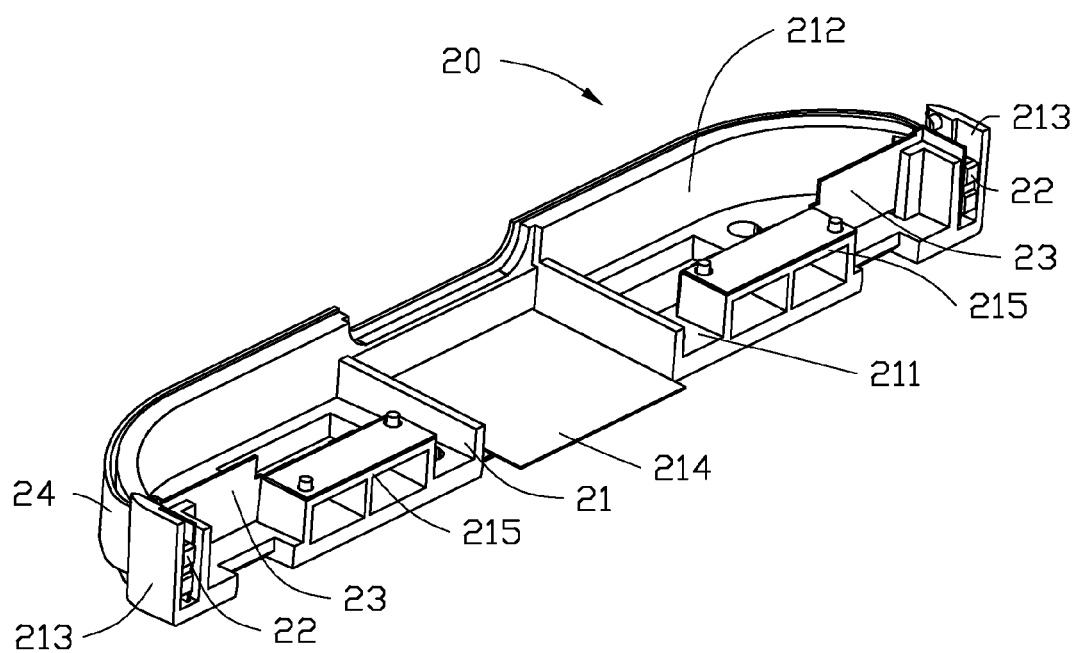
FIG. 3 is an assembled, isometric view of a backlight module utilized in an electronic device, such as, for example, that of FIG. 1.
Figure 4:
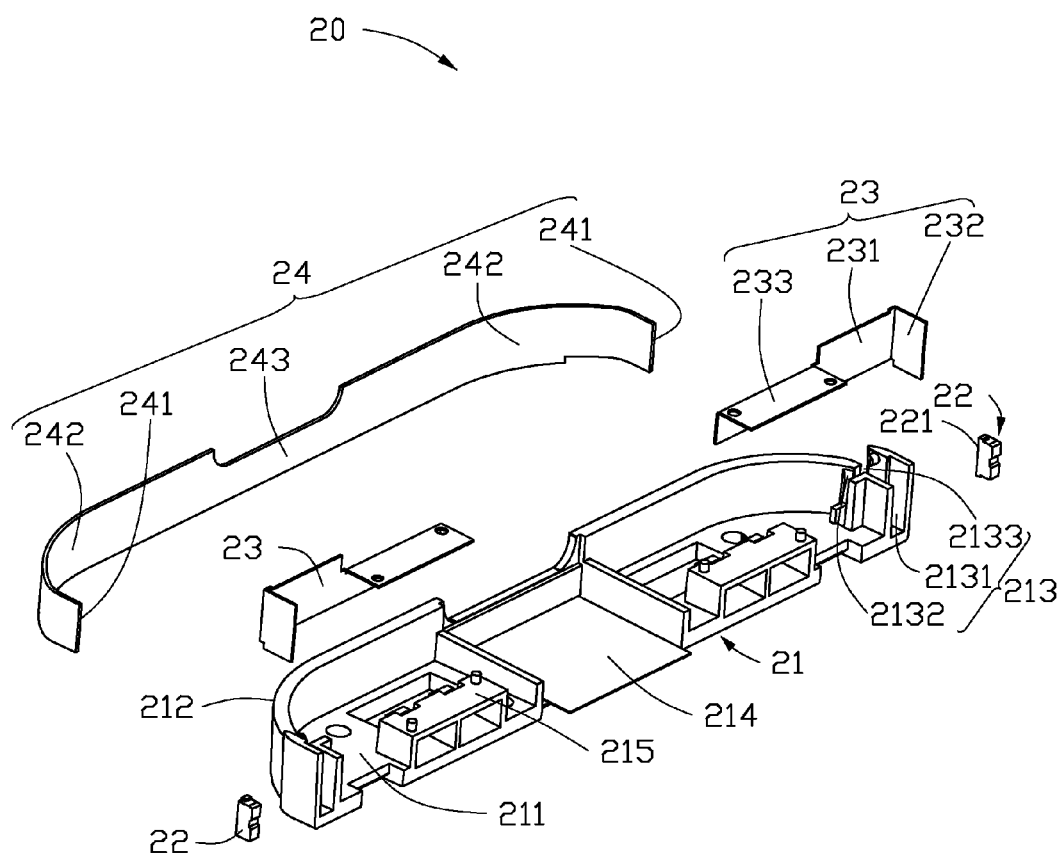
FIG. 4 is an exploded, isometric view of the backlight module of FIG. 3.
Figure 5:
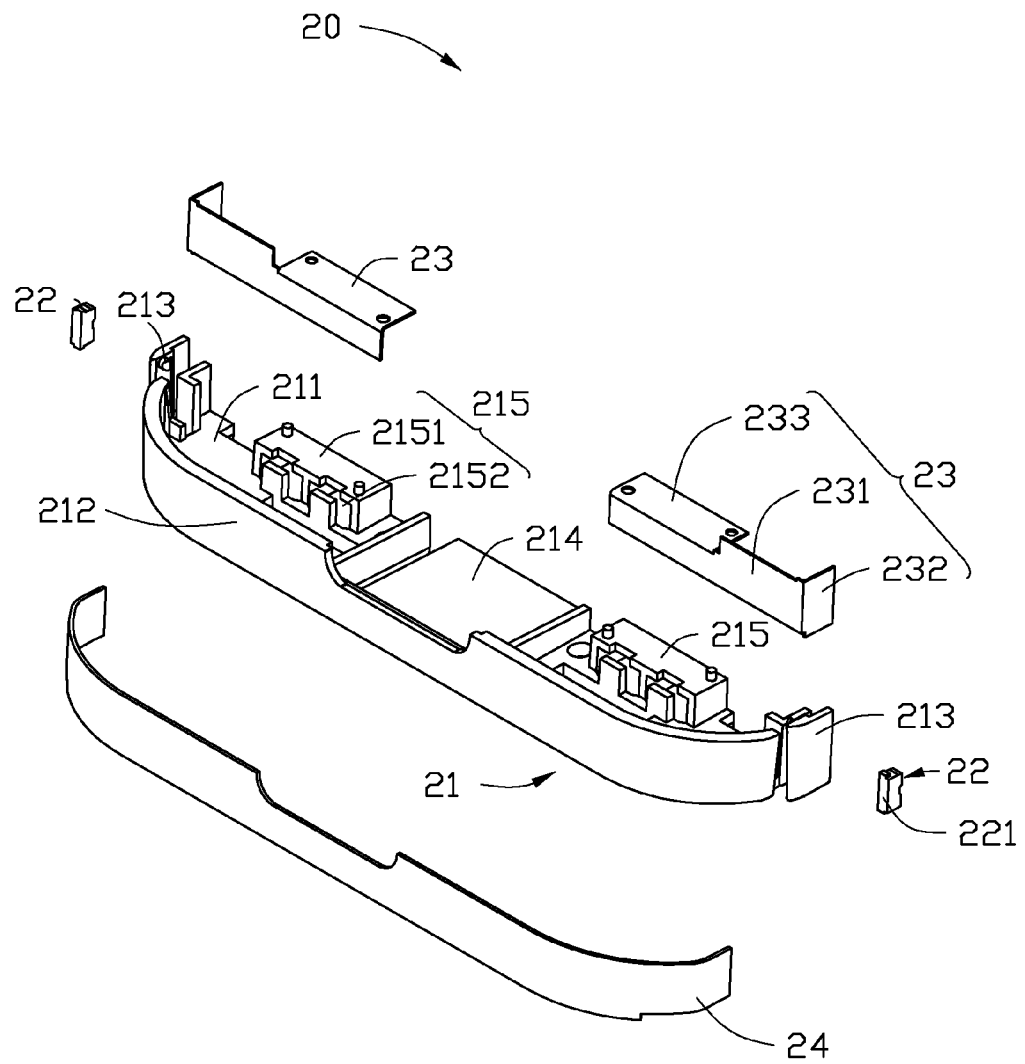
FIG. 5 is similar to FIG. 4, but viewed from another aspect.

Also referring to FIGS. 3 through 5, the backlight module 20 includes a support frame 21, two light sources 22 fixed adjacent to opposite ends of the support frame 21, two flexible printed circuit boards (FPCBs) 23, and a light guide film 24. Alternatively, the backlight module 20 may include more than one support frame 21, such as two, three, and so on. The number of light sources 22 can be one or more than two, and can be fixed to other parts, such as being adjacent to the FPCB 23 which may be one or more than two.

The support frame 21, having a symmetrical structure, includes a support portion 211, a fixing portion 212, two latching portions 213, a partition portion 214, and two locking portions 215. The fixing portion 212 is substantially perpendicular to the supporting portion 211 and connects with an edge of the support portion 211. The latching portions 213 are formed at opposite ends of the support portion 211. The partition portion 214 is formed at the middle region of the supporting portion 211. Each locking portion 215 is formed between the partition portion 214 and one of the latching portions 213.

The fixing portion 212 has a similar structure to the sidewall 112 of the first cover 11 of the housing 10 and includes a straight connecting part (not labeled) and two curved parts (not labeled) connecting to opposite ends of the connecting part, respectively. Each latching portion 213 defines a receiving groove 2131, a latching groove 2132 communicating with the receiving groove 2131 and adjacent to the locking portion 215, and a locking groove 2133 communicating with the receiving groove 2131 and is adjacent to the fixing portion 212. The partition portion 214 is substantially rectangular. The locking portions 215 are symmetrical relative to the partition portion 214, and each locking portion 215 has a hollow rectangular structure. Each locking portion 215 includes a top surface 2151 and defining a connecting groove 2152. Alternatively, the locking portions 215 may have a plurality of hollow cylindrical structures.

The light sources 22 are a plurality of light emitting diodes (LEDs), in which each including a light output surface 221. In the assembly process, two light sources 22 are respectively received in two receiving grooves 2131 of the latching portion 213, and the light output surface 221 of each light source 22 emits the light from the locking groove 2133 of each latching portion 213 directly. The light source 22 may be a cold cathode fluorescent lamp (CCFL) or other kinds of light sources, and the receiving grooves 2131 of the latching portions 213 may be other structure and number according to the light sources 22.

Each FPCB 23 is connected with one of the light sources 22 and includes a substrate 231, a first curved portion 232, and a second curved portion 233. The first and second curved portions 232, 233 are substantially perpendicular to the substrate 231 and connected to adjacent edges of the substrate 231, respectively. Furthermore, the first and second curved portions 232, 233 are substantially perpendicular to each other. In the backlight module 20, the first curved portion 232 and a part of the substrate 231 adjacent to the first curved portion 232 is received in the latching groove 2132 in the latching portion 213. The second curved portion 233 contacts the top surface 2151 of the locking portion 215 and a part of the substrate 231 adjacent to the second curved portion 233 is received in the connecting groove 2152 in the locking portion 215. In the illustrated embodiment, the second curved portion 233 of the FPCB 23 is thermally bonded with the top surface 2151 of the locking portion 215. Alternatively, the FPCB 23 may be other structures, such as a panel having no curved portions. Furthermore, the FPCB 23 may be connected to the locking portion 215 by other means such as by adhesive, or being fixed to the supporting portion 211 or the fixing portion 212 directly.

The structure of the light guide film 24 corresponds to the structure of the sidewall 112 of the first cover 11 and the structure of the fixing portion 212 of the support frame 21. The light guide film 24 includes two light input surfaces 241 at two ends of the light guide film 24, two first light guide portions 242 connected to the light input surfaces 241 respectively, and a second light guide portion 243 connected with the first light guide portions 242. In the illustrated embodiment, the first light guide portions 242 are curved and formed symmetrically relative to the second light guide portion 243, which is straight. Two ends of the light guide film 24 are received in the latching portions 213 through the locking grooves 2133. Thereby, the light input surfaces 241 face the light output surfaces 221 of the light sources 22. Furthermore, the light guide film 24 is held between the fixing portion 212 of the support frame 21 and the sidewall 112 of the first cover 11 of the housing 10. The first light guide portions 242 of the light guide film 24 contact and cover the second transparent parts 1121 of the sidewall 112, and the second light guide portion 243 contacts and covers the first transparent part 1122. Therefore, the sidewall 112 of the first cover 11 is capable of being illuminated.

In alternative embodiments, multiple light guide films 24 may be employed, and include other light guide portions to redirect light. Furthermore, the light guide film 24 may include one or more than two light input surfaces 241.

Since the light guide film 24 is relatively thin and capable of conforming to any shape according to the structure of the sidewall 112 of the first cover 11 of the housing 10, therefore, the housing 10 can permit light to pass therethrough. Furthermore, the light sources 22, the FPCBs 23, and the light guide film 24 are assembled on the support frame 21, and the light guide film 24 contacts the sidewall 112 of the first cover 11 and the fixing portion 212 of the support frame 21, such that the electronic device 100 has a more compact structure and occupying a smaller volume, easing assembly and supporting minimization efforts.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A backlight module, comprising:
a support frame comprising a support portion and a fixing portion connected to an edge of the support portion, wherein the support frame defines at least one receiving groove;
at least one light source comprising a light output surface, and the at least one light source received in the at least one receiving groove; and
at least one light guide film comprising at least one light input surface and at least one light guide portion connected with the at least one light input surface, wherein the at least one light input surface faces the light output surface of the at least one light source, the at least one light guide portion contacts and covers the fixing portion of the support frame.

2. The backlight module of claim 1, wherein the support frame further comprises two latching portions adjacent to opposite edges of the fixing portion, each latching portion defining a receiving groove and a locking groove communicating with the receiving groove; wherein one light source is received in one receiving groove and another light source is received in the other receiving groove, opposite ends of the light guide film are received in the latching portions through the locking grooves, and two light input surfaces of the light guide film are formed at opposite ends of the light guide film.

3. The backlight module of claim 1, wherein the at least one light source comprises a plurality of light emitting diodes.

4. The backlight module of claim 2, further comprising at least one FPCB connected with the at least one light source.

5. The backlight module of claim 4, wherein the at least one FPCB comprises a first curved portion, and each latching portion defines a latching groove, into which the first curved portion is received to connect with the light source.

6. The backlight module of claim 5, wherein the support frame further comprises at least one locking portion to which the at least one FPCB is connected.

7. The backlight module of claim 6, wherein the at least one FPCB comprises a substrate and a second curved portion, and the at least one locking portion comprises a top surface and defines a connecting groove recessing therefrom; the second curved portion is connected to the top surface, and a part of the substrate is received in the locking portion through the connecting groove.

8. The backlight module of claim 6, wherein the second curved portion is thermally bonded with the top surface of the at least one locking portion.

9. An electronic device, comprising:
a housing comprising a sidewall of transparent material; and
a backlight module received in the housing comprising:
a support frame comprising a support portion and a fixing portion connecting to an edge of the support portion, and the support frame defining at least one receiving groove;
at least one light source comprising a light output surface and fixed on the support frame; and
at least one light guide film held between the sidewall of the housing and the fixing portion of the support frame, wherein the at least one light guide film comprises at least one light input surface facing the light output surface of the at least one light source.

10. The electronic device of claim 9, wherein the support frame further comprises two latching portions adjacent to opposite edges of the fixing portion, and each latching portion defines a receiving groove and a locking groove communicating with the receiving groove, wherein one light source is received in one receiving groove, and another light source is received in the other receiving groove, opposite ends of the light guide film are received in the latching portions through the locking grooves, and two light input surfaces of the light guide film are formed at opposite ends of the light guide film.

11. The electronic device of claim 9, wherein the at least one light source comprises a plurality of light emitting diodes.

12. The electronic device of claim 9, wherein the sidewall of the housing comprises a straight first transparent part and two curved second transparent parts connected with the first transparent part, and the light guide film comprises two curved first light guide portions and a straight light guide portion corresponding to the structure of the sidewall of the housing.

13. The electronic device of claim 12, wherein the light guide film contacts the sidewall of the housing and the fixing portion of the support frame.

14. The electronic device of claim 10, wherein the backlight module further comprises at least one FPCB connected to the at least one light source.

15. The electronic device of claim 14, wherein the at least one FPCB comprises a first curved portion, and each latching portion defines a latching groove, and the first curved portion is inserted into the at least one receiving groove of the latching portion through the latching groove to connect with the light source.

16. The electronic device of claim 15, wherein the support frame further comprises at least one locking portion to which the at least one FPCB is connected.

17. The electronic device of claim 16, wherein the at least one FPCB comprises a substrate and a second curved portion, and the at least one locking portion, having a hollow structure, comprises a top surface and defines a connecting groove recessing from the top surface; the second curved portion is connected to the top surface, and a part of the substrate is received in the locking portion through the connecting groove.

18. The electronic device of claim 16, wherein the second curved portion is thermally bonded with the top surface of the at least one locking portion.

* * * * *